June 16, 1925.

H. E. BAKER 1,541,782

SPRING SUSPENSION FOR TRAVELING CRANES

Filed Dec. 10, 1924 7 Sheets-Sheet 1

Inventor
Hubert E. Baker
By
Frank E. Liverance, Jr.
Attorney.

June 16, 1925. 1,541,782

H. E. BAKER

SPRING SUSPENSION FOR TRAVELING CRANES

Filed Dec. 10, 1924   7 Sheets-Sheet 4

Inventor
Hubert E. Baker
By Frank E. Liverance Jr.
Attorney

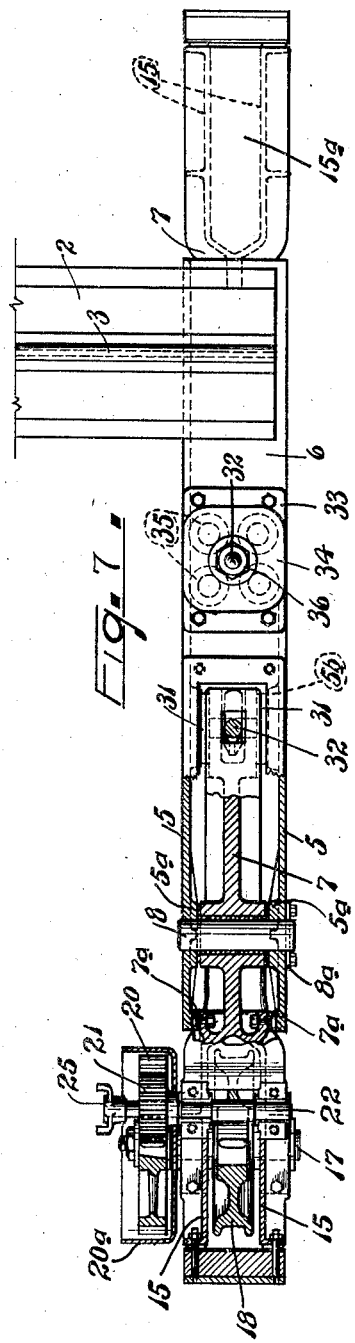

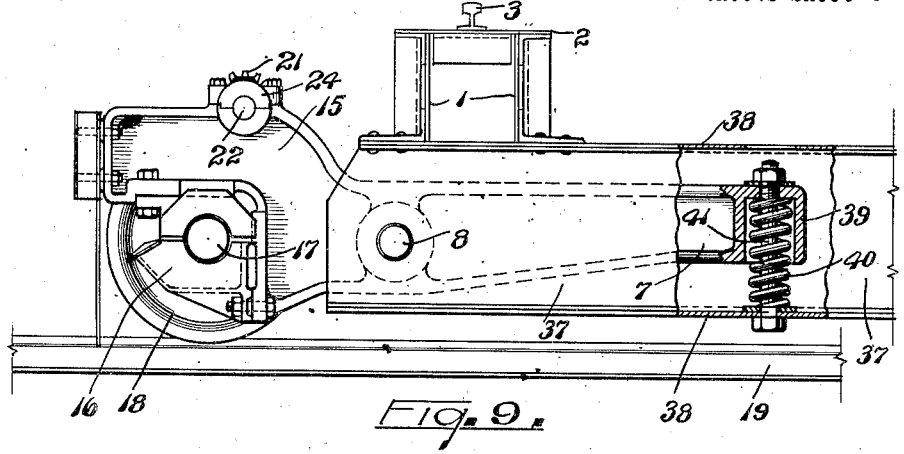
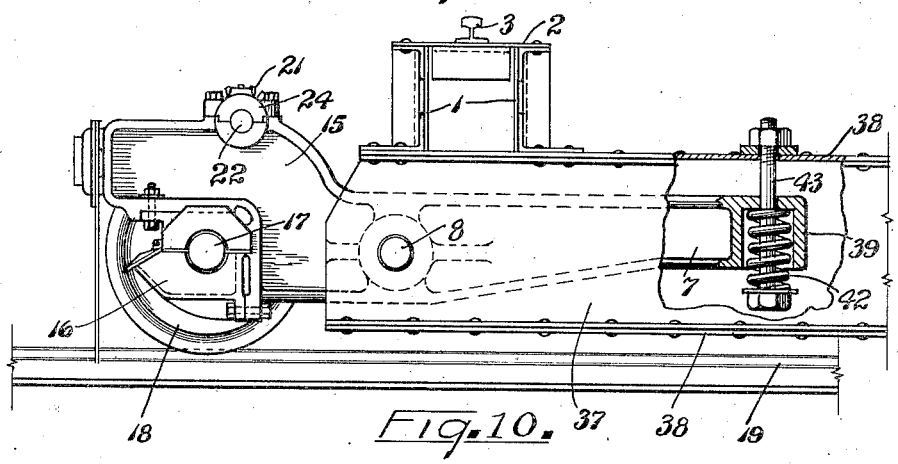
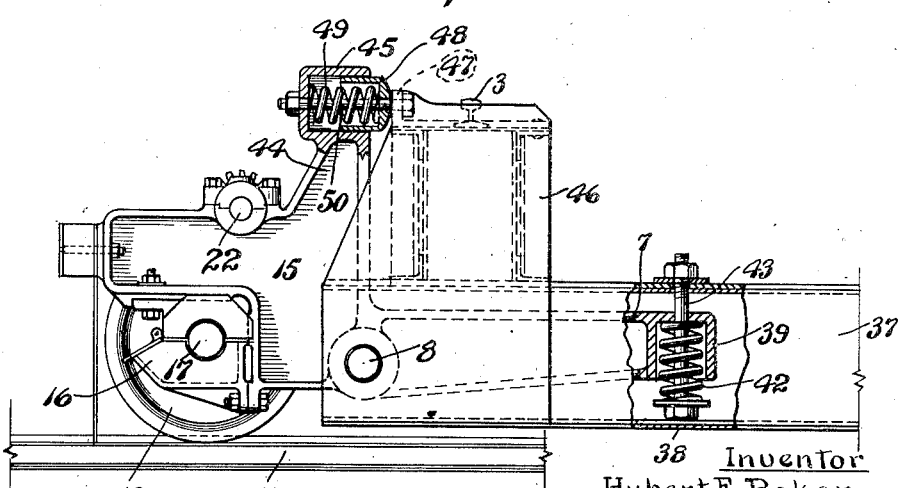

Inventor
Hubert E. Baker
By Frank E. Liverance Jr.
Attorney.

Patented June 16, 1925.

1,541,782

UNITED STATES PATENT OFFICE.

HUBERT E. BAKER, OF MUSKEGON HEIGHTS, MICHIGAN, ASSIGNOR TO MANNING, MAXWELL & MOORE, INC., OF NEW YORK, N. Y., A CORPORATION OF NEW JERSEY.

SPRING SUSPENSION FOR TRAVELING CRANES.

Application filed December 10, 1924. Serial No. 754,920.

*To all whom it may concern:*

Be it known that I, HUBERT E. BAKER, a citizen of the United States of America, residing at Muskegon Heights, in the county of Muskegon and State of Michigan, have invented certain new and useful Improvements in Spring Suspensions for Traveling Cranes; and I do hereby declare the following to be a full, clear, and exact description of the invention, such as will enable others skilled in the art to which it appertains to make and use the same.

The present invention relates to a spring suspension for traveling cranes. Cranes of the character to which this invention is applicable include elongated bridge members, lengthwise of which a trolley may run, and said bridge members are supported at their ends by trucks adapted to travel on rails or tracks which are suitably supported, usually at each side of the building in which the crane is installed. These cranes, built from steel plates and structural shapes riveted together are subject to severe usage and are under very heavy strains at times when in use. The weight supported from the trolley is heavy and not only is the weight moved back and forth by the trolley on the bridge members, but the bridge travels back and forth on the supporting tracks either independently or simultaneously with the trolley, such movement adding to the strains which the crane is obliged to withstand. As a result severe shocks, jars and vibrations occur which, transmitted to the riveted built-up girders of the bridge members and to the traveling mechanism and also to the building structure which supports the tracks on which the trucks run, serve to loosen rivets, both of the girders and the building frame and cause undue wear of the mechanism with a consequent deterioration of the building structure and of the crane. My invention is designed to obviate, in a relatively simple manner, such shocks, jars and vibrations to a great extent if not entirely, thereby eliminating severe shocks and jars to the crane or to the frame of the building and thus prolonging the useful life of both; and it is to this end that I have devised the structures shown, understanding of which may be had from the following description taken in connection with the accompanying drawings, in which, Fig. 1 is a side elevation of a traveling crane equipped with my invention.

Figure 5:
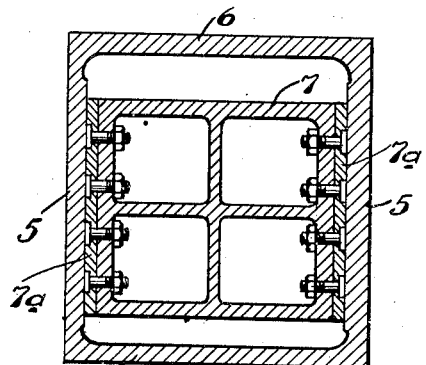
Figure 6:
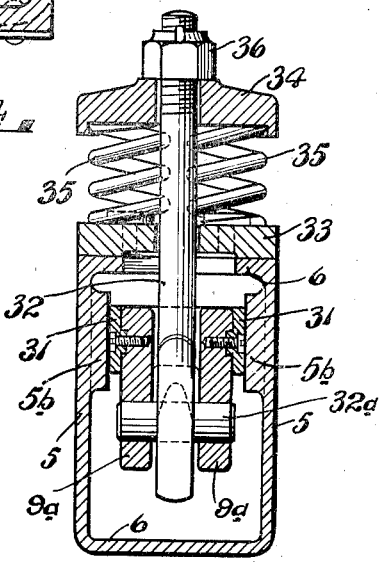

Figs. 5 and 6 are transverse sections through the truck taken on the planes of lines 5—5 and 6—6, respectively, of Fig. 8.

Figure 2:
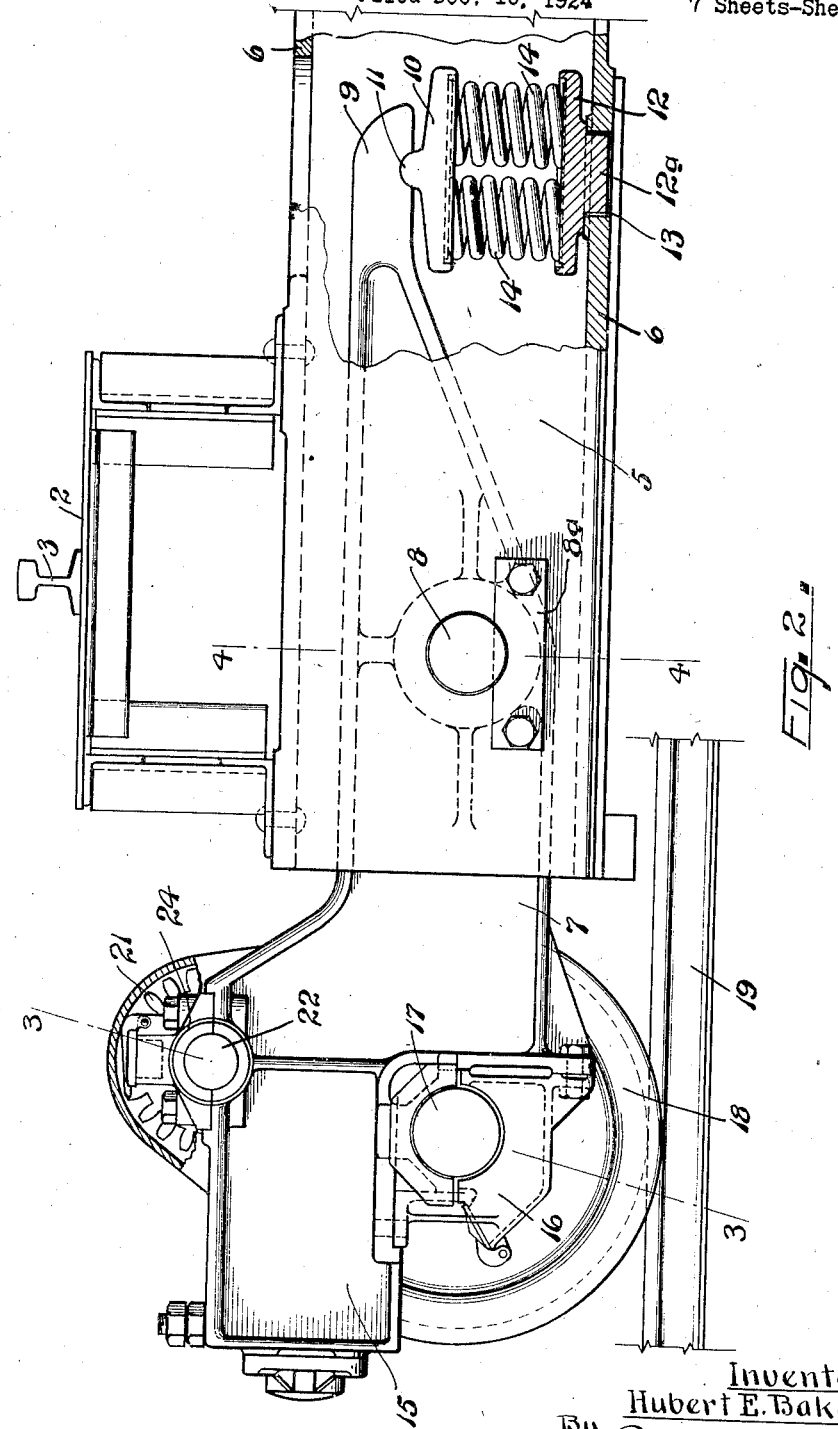
Fig. 2 is a fragmentary enlarged end elevation of the crane, a part of the truck carrying the bridge girders being shown, partly in elevation and partly in section.

Fig. 7 is a plan view, with one end shown partly in horizontal section, of the truck for carrying the bridge girders, there being a somewhat different specific form of spring suspension shown in this figure than that shown in Fig. 2.

Fig. 8 is an elevation of the truck shown in Fig. 7, one end thereof being shown partly in vertical section.

Figs. 9, 10 and 11 are fragmentary elevations, with parts broken away and shown in section, of different specific forms of structure which may be used for the spring suspension.

Figure 12:
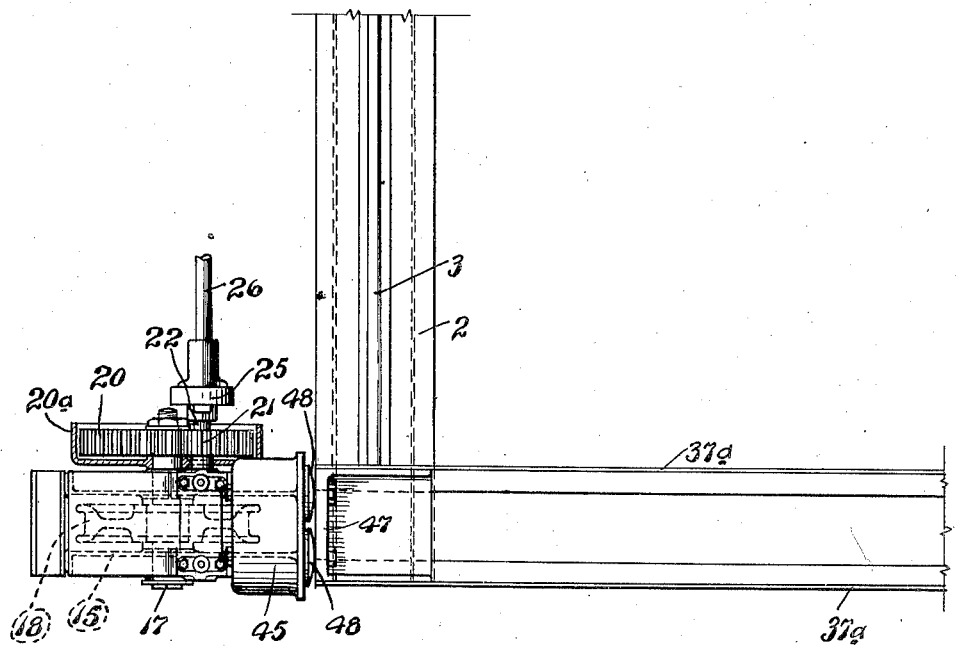

Fig. 12 is a fragmentary plan view showing a still further form or modification of structure for the spring suspension.

Figure 13:
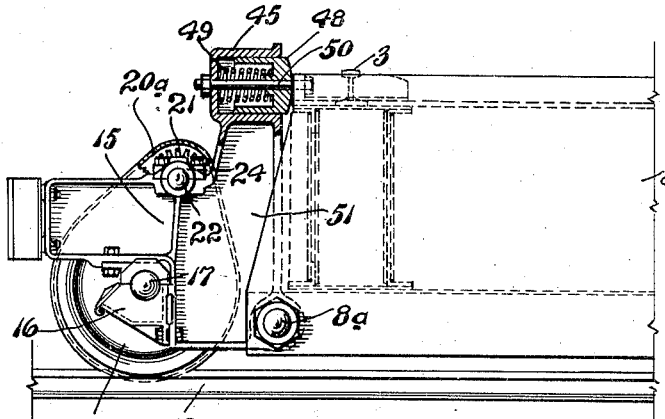
Figure 14:
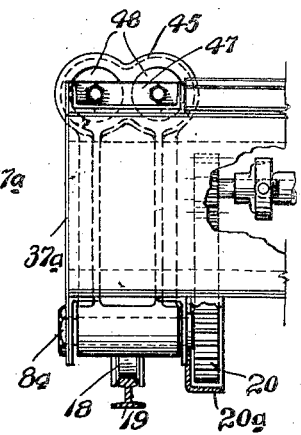

Fig. 13 is a fragmentary end elevation, partly in section, of the structure shown in Fig. 12, and Fig. 14 is a fragmentary side elevation, with parts broken away and in section, of the structure shown in Figs. 12 and 13.

Like reference characters refer to like parts in the different figures of the drawings.

Figure 1:
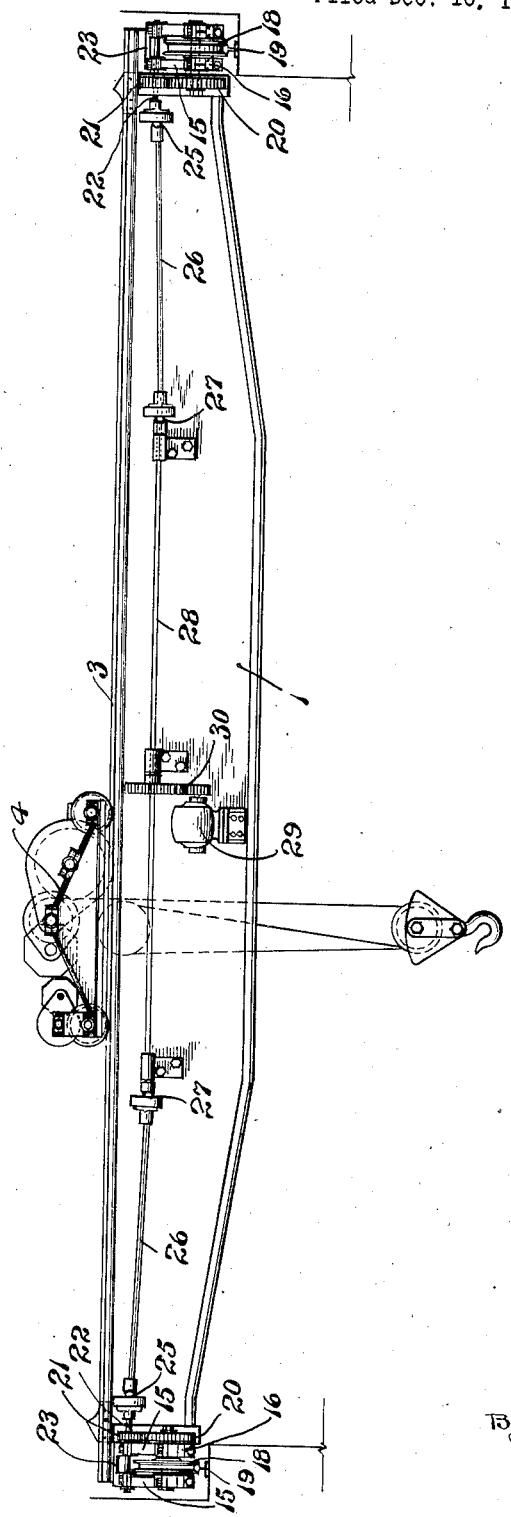

In the construction of the crane, the elongated bridge girders are of conventional form being built up from plates, structural shapes and gussets riveted together and including spaced apart side plates 1 and a top plate 2 suitably connected together to make a permanent construction. Usually there are two of said bridge girders spaced a distance apart, and each at the upper side of its top plate 2 carries a track rail 3 having a section similar to a railway rail, on which tracks the trolley 4 is mounted for back and forth movements. This trolley may be of any desired type and form and that shown in Fig. 1 is of a well-known type used with traveling cranes.

Figure 4:
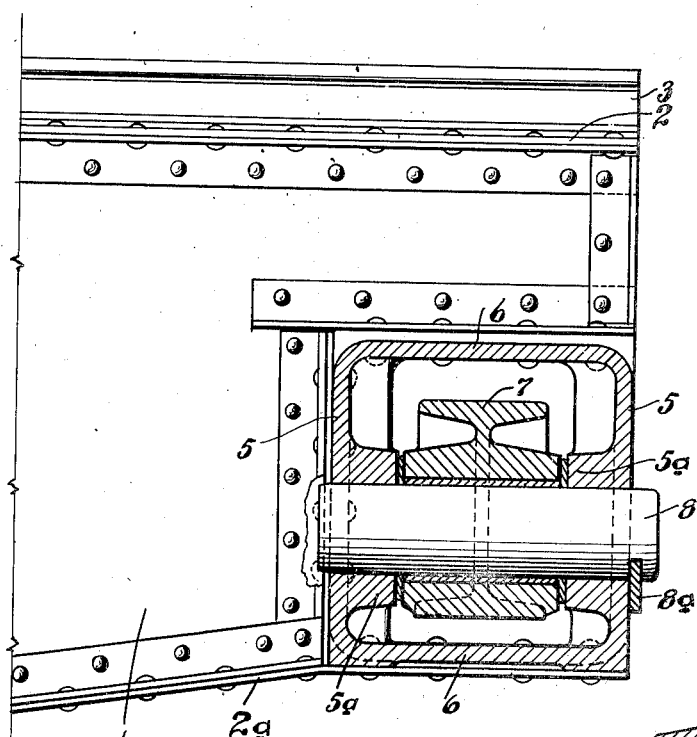
Fig. 4 is a fragmentary vertical section on the plane of line 4—4 of Fig. 2.

At each end of the bridge, trucks are located for carrying the same. Each truck, in the structure shown in Figs. 2, 4, 5 and 6, includes a hollow beam having spaced apart sides 5 and upper and lower sides 6 formed as an integral steel casting. Each end of this beam is open for the reception of a member 7 of cast steel which is pivotally mounted on a pin 8 extending between and mounted on the spaced sides 5 of the truck beam described. The sides 5 of the beam where the pin 8 passes therethrough are thickened and strengthened, as indicated at $5^a$, to furnish a proper bearing for the pin 8. At one end, pin 8 is provided with a slot and a locking plate $8^a$, permanently connected to a side 5 of the beam, enters the slot and serves to hold the pin securely in place. The bridge girders at the lower corners of the ends are recessed for the reception of the beam and are permanently connected to said beam by rivets, as shown in Fig. 4, making a very strong and rigid construction.

The inner end of each of the members 7 (see Fig. 2) is formed with a projecting finger 9, underneath which a cap 10 is located formed at its upper side with a projection 11 shaped to fit a suitable socket in the under side of the finger 9. Directly below the cap 10 a similar inverted member 12 is located, it having a central downward extension $12^a$ fitting into an opening 13 made to receive it in the lower side 6 of the beam. Heavy coiled springs 14 are interposed between the member 12 and the cap 10, as shown.

The member 7, as shown in Fig. 5, is equipped with bearing plates $7^a$ at each side immediately adjacent the end of the hollow beam in which it is inserted, this being for the purpose of preventing lateral movements of the member 7 with respect to the beam. At its outer end said member 7 is divided to make spaced apart vertical sides 15 connected at their upper edges by an integral cross plate $15^a$. Said parts 15 are formed so as to receive suitable boxes 16 similar in construction to the bearings used on railway car wheel trucks. The boxes are permanently secured in place and furnish bearings for shafts 17, on each of which a truck wheel 18 is permanently secured, the same passing between the spaced apart sides 15 before described, and riding on the tracks or rails 19 located one at each side of the building in which the crane is installed.

Figure 3:
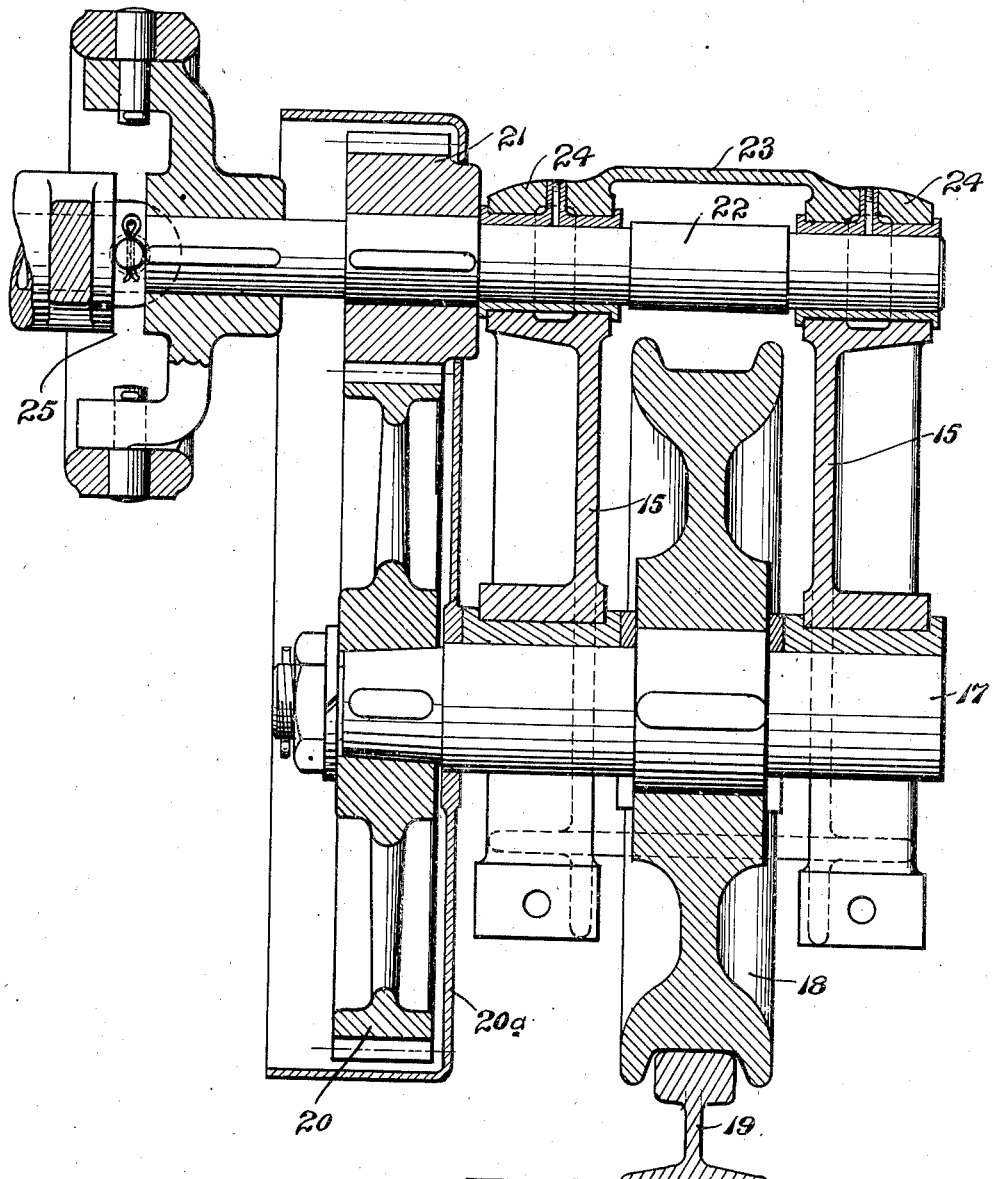
Fig. 3 is an enlarged vertical section taken substantially on the plane of line 3—3 of Fig. 2.

At the inner end of each shaft 17 a gear 20 is secured, meshing with which is a smaller gear 21 keyed or otherwise fixed on a short shaft 22 mounted above each wheel 18 and received in suitable bearings formed at the upper side of the member 7, the bearings being completed by a plate 23 extending between the upper sides of the parts 15, at each end of which plate 23 a co-operating bearing portion 24 is integrally formed, as shown in Fig. 3. The shaft 22 extends a short distance beyond the gear 21 and may be connected, by a universal coupling 25, with the outer end of a shaft 26 which, at its inner end, is connected by a similar universal coupling 27 with a drive shaft 28 mounted alongside of and parallel to a bridge girder. Usually the movement of the trucks due to the springs is so slight, and the length of the shaft so great between bearings that it is sufficiently flexible not to be adversely affected by such movement, and a universal coupling is not necessary, but in cases where the shaft is short between bearings or the movement, due to the springs, unusually great, the universal couplings might become a desirable or necessary feature. The drive shaft 28 is adapted to be driven by an electric motor 29 carried by said bridge girder, suitable gearing 30 being interposed between the motor and shaft and making a driving connection between the two. It will be noted that the drive shaft 28 drives two intermediate shafts 26, one at each end of the bridge girder in unison. A suitable guard for the gears 20 and 21 is placed thereon, as indicated at $20^a$.

With this construction the crane is spring suspended and the shocks, jars and vibrations to which the crane is subjected in service are to a great extent absorbed and greatly lessened by the springs 14 which are subject to compression and expansion under their re-action to jars and shocks, thus saving the bridge girders and the riveted connections thereof and the traveling mechanism from all, or nearly all, of the abrupt jars and shock and the strains resultant thereto to which it would otherwise be subjected. Similarly, the building structure carrying the tracks 19 is saved from the severe strains resulting from such jars and shocks ordinarily transmitted, but with this structure absorbed and softened by the springs 14 associated with the trucks in the manner described.

In Figs. 6, 7 and 8 a form of spring suspension somewhat different from that appearing in Figs. 1 and 2 is shown, the object of which is to provide a ready means of adjusting the tension of the springs and compensate as far as possible for unequal loading of the track wheels due to eccentric permanent loads, such as bridge drive mechanism which is usually on one side only, and operator's cage which is usually on one side and close up to one end. The inner end of each member 7 is divided, as indicated at 9ª, so that a rod 32, formed with a hook at its lower end, may pass between the parts 9ª, the hook engaging with a pin 32ª extending between and supported at its ends on the two spaced apart sides 9ª as shown in Fig. 6. Each part 9ª near its upper edge and at its outer side carries a plate 31 which has close engagement with the inner side of a boss 5ᵇ cast integral with and extending from each side 5 of the hollow truck beam. These plates in conjunction with the plates 7ª attached at each side of the member 7 at each of the outer ends of the beam, hold said member from lateral movements with an avoidance of eccentric strains. The rod 32 extends upwardly through a plate 33 permanently connected to the upper side 6 of said hollow beam, between which plate and an upper cap 34 a plurality of heavy coiled springs 35 are disposed. The rod 32 extends through the cap 34 and is threaded at its upper end to receive a nut 36. It is evident that this structure provides a spring suspension having all of the advantages of the construction shown in Fig. 2 and differing only in detail of structure, and in having adjustable spring tension.

In Figs. 9 to 14 inclusive other different forms or modifications of structure for attaining the same ends are shown. In Figs. 9, 10 and 11 the hollow beam, instead of being an integral casting, is formed of metal side plates 37 and upper and lower plates 38 suitably riveted together but having open ends, the same as in the hollow integrally cast beam first described. The inner end of the member 7 is formed with a socket 39 open at its under side. A heavy coiled spring 40 is seated in said socket and extends to the upper side of the lower plate 38 of the truck beam, a headed bolt passing through said lower side 38, through the spring and through the closed end of the socket 39 receiving a nut thereabove. In Fig. 10 the structure of socket 39 is the same as in Fig. 9 but the spring 42 seated in the socket is located around and carried by a headed bolt 43, which is located within the beam, passing upwardly through the spring and the closed end of the socket 39 and thence through the upper plate 38 of the beam, receiving a nut thereon above said upper plate. While Figs. 9 and 10 show but one of the springs 40 and 42 it is evident that any desired number within the limits prescribed by the space available may be used. These structures also have all of the advantages and save the crane from shocks and jars the same as in the other structures previously described.

In Fig. 11 the inner end of the member 7 is equipped with a spring 42 the same as described with reference to Fig. 10 and shown in such figure. Said member 7 however is modified and formed with an upwardly projecting arm 44 adjacent the end of the hollow beam, at the upper end of which sockets 45 are formed positioned horizontal and having open ends toward the truck beam but located above the same. At each side of the truck beam, metal plates 46 are secured, the same extending above the beam and alongside the ends of those portions of the bridge girders which extend above the truck beams. An abutment member 47 is riveted to said plates and to the top plate 2 of the adjacent girder, against which the ends of caps 48 bear. The caps having a telescopic fit in the sockets 45. A heavy coiled spring 49 is seated in each socket 45 between the closed end thereof and the closed end of the cap 48. A headed bolt 50 passes through the abutment member 47, the closed ends of the cap 48 and socket 45 and through the spring 49, as shown, said bolt at its outer end being equipped with the usual nut. This structure increases the number of springs applicable to the trucks and may be used with the heavier types of cranes installed.

In Figs. 12, 13 and 14 the truck beams include deeper side plates 37ª suitably connected together and at each end of the built-up beam made, a member 51 is provided to take the place of the member 7 heretofore described. This member is pivotally mounted at 8ª close to the end of the truck beam, and instead of having a portion extending inwardly into the beam, has a part extending upwardly the same as the arm 44 extends upwardly in Fig. 11, being similarly equipped with sockets 45 at the upper end, telescoping caps 48 in said sockets, springs 49 inclosed between said caps and sockets, and rods 50 passing through the abutment member, cap, sockets and springs, identical with the structure previously described. The members 51 also serve to carry the truck wheels 18 being provided with spaced apart sides 15 and bearings 16 for the reception and mounting of such wheels; and the wheels are driven in the same manner.

Many other variations in form and detail of construction may be resorted to without departing from the invention. In all of these forms the springs provided serve to absorb and soften any jars or shocks to which the crane is submitted while in service. This improvement in crane structure is one of great importance. Cranes at best are very liable to abuse and are always subjected to very heavy service. While they are very strong and designed to carry great weights it does not help the same in any manner to be directly subject to severe jars and shocks, particularly when heavily loaded and moving. With this invention however the evil effects of such jars and shocks are substantially eliminated.

The invention is defined in the appended claims and is to be considered as comprehensive of all forms of structure coming within their scope.

I claim:

1. In a traveling crane, a bridge, a beam secured at each end of the bridge, wheel carrying members pivotally mounted one at each end of each beam, a wheel carried by each wheel carrying member, and spring means interposed between each wheel carrying member and the beam designed to withstand and absorb shocks and vibrations to which the crane is subjected, substantially as described.

2. In a traveling crane, spaced apart parallel tracks, a bridge located between the tracks, trucks at each end of the bridge, each of said trucks including two wheel carrying members and intermediate beam, said beam being connected to the bridge, yielding connections between said wheel carrying members and beam designed to absorb shocks and jars to which the crane is subjected in service, and wheels on said wheel carrying members riding on said tracks, substantially as described.

3. In a traveling crane, spaced apart parallel tracks, a bridge disposed between said tracks, a truck secured at each end of the bridge, wheel carrying members each having a wheel rotatably mounted thereon pivotally mounted one at each end of each truck, said wheels riding on said tracks, and yielding spring means disposed between each of said pivotally mounted members and an adjacent relatively rigid part of the truck for absorbing shocks and vibrations to which the crane is subjected.

4. A traveling crane comprising, a horizontal bridge, a rigid beam connected to the bridge at each end thereof, a member pivotally connected to each end of the beam and extending beyond the same, a wheel rotatably mounted on each member beyond each end of the beam, and yielding spring means interposed between said member and its associated beam re-acting against the weight of said bridge and connected beams, substantially as described.

5. In a traveling crane, a rigid structure including bridge girders and a beam attached thereto at each end thereof, said beams being located at right angles to the length of the bridge girders, a member pivotally connected at each end of each beam, a wheel carried by each member a distance beyond each end of each beam, and spring means interposed between each member and said rigid structure opposing and re-acting against the weight of said structure, substantially as described.

6. In a traveling crane, a bridge, a hollow beam having spaced apart sides and spaced apart top and bottom rigidly connected to each end of the bridge, said beam being open at both ends, an elongated member inserted in each end of each beam and pivotally connected thereto at a point between its ends and near the outer end of the beam, a wheel rotatably mounted on and carried by each member at the outer end thereof, and spring means interposed between the inner end of each of said members and the beam, said means acting against the weight of said bridge and beam, substantially as described.

7. In a traveling crane, spaced apart bridge girders, an elongated hollow beam at each end of the bridge girders to which said members are permanently connected, said beam being open at both ends, a rigid member inserted in each end of each beam, means for pivotally mounting each member between its ends on its associated beam and adjacent the end of the beam, wheels rotatably mounted adjacent the outer ends of said members, and yielding spring means disposed between the inner end of each member and its associated beam designed to react against the weight of said bridge members, beams and weights carried on the bridge members and the shocks and vibrations to which the crane is subjected in service.

8. In a traveling crane, a bridge, a hollow beam rigidly secured at each end of the bridge, said beam being open at each end, a member inserted in each end of each beam and pivotally connected thereto between its ends, a wheel rotatably mounted on and carried at the outer end of each member, and a strong compression spring means operatively interposed between the inner end of each member and its associated beam, substantially as and for the purposes described.

9. In a traveling crane, a bridge, a hollow beam located at each end of the bridge transverse to the length thereof, each beam being open at each end, a member inserted into the open end of each beam and pivotally connected thereto between its ends, a wheel rotatably mounted on the outer end of each member, and a spring disposed under compression between the inner end of each member and its associated beam, substantially as described.

10. In a traveling crane, an elongated bridge, a hollow beam rigidly connected at each end of the bridge transverse to the length thereof, each end of said beam being open, wheel carrying members pivotally connected one at each end of the hollow beam, each of said members having a portion extending into the adjacent open end of the beam, a yielding compression spring interposed between said inwardly extending end of each member and the associated beam, and a wheel rotatably mounted on each member at its outer portion and beyond each end of each beam, substantially as described.

11. In a traveling crane, a bridge, a beam located at each end of the bridge and rigidly connected thereto, a member pivotally connected at each end of each beam, each of said members having a truck wheel rotatably mounted thereon, spring means under compression disposed between each of said members and an adjacent rigid part of the structure, a motor carried on the bridge, a shaft driven by said motor, a universal coupling connection at each end of the shaft, two additional shafts connected one with each universal coupling connection, a second universal coupling connection at the outer end of each of the additional shafts, and gearing connected with and driven by each of the second named universal coupling connections, said gearing being operatively connected with a wheel at each end of the crane, substantially as described.

12. In a crane, a rigid bridge adapted to carry a trolley, trucks one at each end of the bridge each including a rigid beam disposed at right angles to the length of the bridge and permanently connected thereto and wheel carrying members pivotally connected one at each end of each beam, spring means interposed between said wheel carrying members and its associated beam, a wheel rotatably mounted on each of the wheel carrying members, a motor carried by the bridge, and driving connections between said motor and two of said wheels one at each end of the bridge including gearing, shafts, and universal coupling connections, permitting movement of the wheel carrying members with respect to the relatively rigid bridge, substantially as described.

13. In a traveling crane, a bridge, a hollow beam located at each end of the bridge transverse to the length thereof, each beam being open at each end, a member inserted into each open end of each beam and pivotally connected thereto between its ends, a wheel rotatably mounted on the outer end of each member, a yielding means disposed under compression between the inner end of each member and its associated beam, and wearing plates connected to each member at each side thereof at its inner end having bearing against adjacent inner sides of the associated beam, substantially as described.

14. In a traveling crane, a bridge, a hollow beam secured at each end of the bridge, each of said beams having open ends, a member inserted into the open end of each beam and pivotally connected thereto between its ends and near each end of the beam, spring means disposed under compression between the inner end of each member and its associated beam, wearing plates attached at each side of each member at the inner end thereof and also at each side of each member adjacent each end of the beam, said plates having close contact with adjacent inner vertical sides of the beam, substantially as described.

15. In a traveling crane, an elongated bridge, a hollow beam located at each end of the bridge transverse of the length thereof, each beam being open at each end, a member inserted in each end of each beam and pivotally connected thereto between its ends, a wheel rotatably mounted on and carried at the outer end of each member, strong compression spring means operatively interposed between the inner end of each member and its associated beam, and means for adjusting the tension of said spring means, substantially as described.

16. In a traveling crane, a bridge, a beam located at each end of the bridge transverse to the length thereof, wheel carrying members pivotally mounted one at each end of each beam, a wheel carried by each wheel carrying member, spring means interposed between each wheel carrying member and the beam designed to soften shocks and vibrations to which the crane is subjected, and means for adjusting the tension of said spring means, substantially as described.

17. A traveling crane, an elongated bridge, a hollow beam secured at each end of the bridge, a wheel carrying member extending partially into each end of each beam and pivotally connected to the beam between its ends, a bolt and compression spring means associated with and disposed between the inner end of each of said members and the associated beam, said bolt carrying an adjusting nut thereon, and means for operatively connecting the beam, bolt, spring means and inner end of said member, whereby on changing the position of the nut on the bolt the tension of the spring may be adjusted, substantially as described.

In testimony whereof I affix my signature.

HUBERT E. BAKER.